Sept. 1, 1953    J. F. ECKELS ET AL    2,650,551
EXTRUDER HEAD

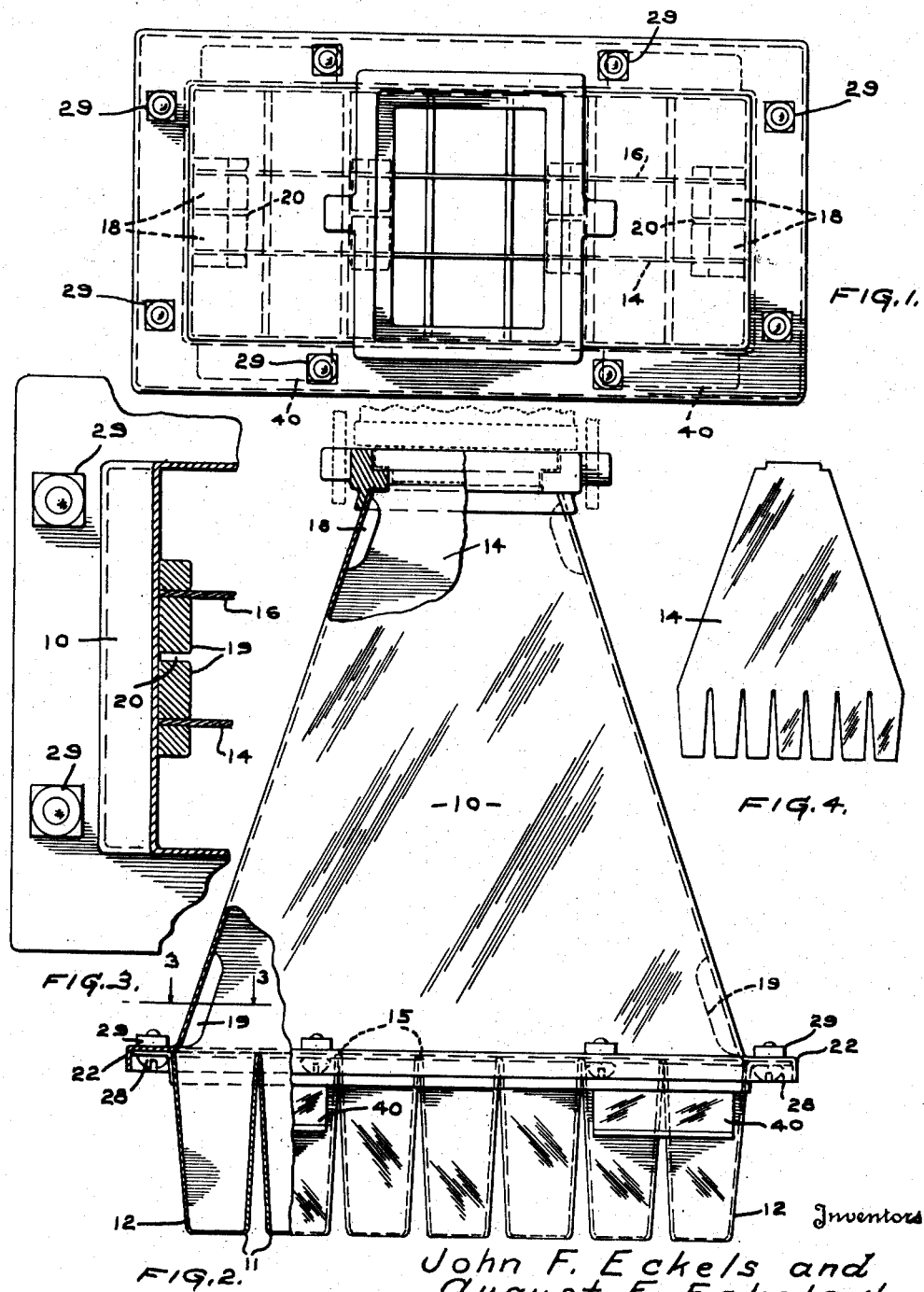

Filed May 11, 1951    2 Sheets-Sheet 2

Inventors
John F. Eckels and
August E. Eckels, Jr.

By J. Wesley Everett
Attorney

Patented Sept. 1, 1953

2,650,551

UNITED STATES PATENT OFFICE 2,650,551

EXTRUDER HEAD

John F. Eckels and August E. Eckels, Jr., Baltimore, Md.

Application May 11, 1951, Serial No. 225,886

3 Claims. (Cl. 107—1)

The present invention relates to an extruder head for semi-liquid filling machines and in particular to one for forming the semi-liquid in a plurality of single deposits in which each deposit is composed of a predetermined amount of material from several filling machines, or individual sources.

While the head may be used for other purposes, its primary use is for manufacturing ice cream harlequin or Neapolitan blocks which are made up of two or more flavors.

At the present time these multi-flavor blocks are first made in long strips, one flavor being superimposed upon the other by separate machines while the ice cream is partly frozen. These strips are transferred to a cold box where they are hardened, after which they are put through a cutting machine to form the desired size block or serving. The blocks are then manually wrapped and placed in small paper or cardboard containers in which they are offered to the trade.

The primary object of the invention is to provide an extruded head or die for receiving a semi-liquid or semi-frozen material from a machine or several machines, as the case may be, and depositing the same directly into the paper, or cardboard containers.

Another object of the invention is to provide such a device with means for receiving the material into individual compartments within the extruded head from several machines or supply sources and distributing the same in predetermined quantities to a plurality of individual nozzles.

Still another object of the invention is to provide such a head without any moving parts.

A further object of the invention is to provide a head that may be easily dismantled for cleaning.

Still a further object of the invention is to provide a device whereby the time of manufacture and handling of this type product may be greatly reduced.

While several objects have been pointed out, other objects, uses and advantages will become apparent as the nature of the invention is more fully disclosed which consists in its novel construction, combination and arrangement of parts as shown in the accompanying drawings and the following detailed description in which:

Figure 1 is a top plan view of the head.

Figure 2 is a side view of the same, partly in elevation and partly in section.

Figure 3 is an enlarged fragmentary sectional view taken along line 3—3 of Figure 2.

Figure 4 is a view in elevation of one of the extruder head separators.

In referring to the drawings of the invention like and similar character references are used throughout the several views to indicate like and similar parts thereof.

Figure 8:
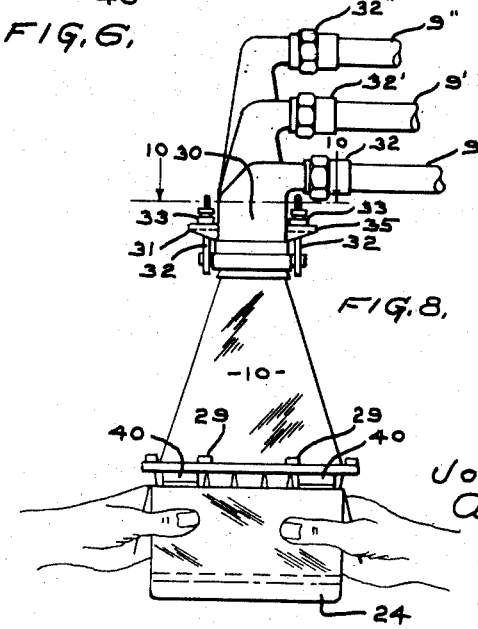
Figure 8 is a view in elevation of the head on a reduced scale illustrating the manner in which the head is connected to the supply lines and the manner in which the head is used.

The construction of the extruded head comprises in general an elongated housing 10, having a relatively small opening adjacent the upper end for connecting the housing with the several supply lines 9, 9' and 9" as shown in Figure 8, and a plurality of nozzles 12 extending downwardly from the bottom of the housing through which the semi-liquid mass or semi-frozen ice cream is extruded.

It will be noted that the nozzles are shown in rectangular form in horizontal cross-section and are adapted to produce a standard size individual block of ice cream of multiple flavors, and are generally known as harlequin blocks.

The detail construction of the head is comparatively simple. The shape of the housing 10 is preferably in the form of an inverted funnel, the upper end, or narrow portion having an opening therein to admit the semi-frozen ice cream mix from ice cream filling machines, or supply sources, as storage tanks etc. It is also preferable to have the housing tapered gradually outwardly toward the bottom to where the ice cream enters the nozzles 12, which will be hereinafter more fully described.

The inner area of the head is arranged so that it may be divided into a number of separate compartments. The compartments are set off by a plurality of separators 14 and 16. These separators extend from the upper inlet opening entirely through the head and preferably into the nozzles 12 and ending just short of the nozzle openings. However, for mixes or materials that may be capable of working under increased hardness, the separator may end at the upper end of the nozzle, or within a short distance from the top. In the present drawings the separators are shown extending to a point adjacent the outer ends of the nozzles. These separators are detachable and are shiftable to several locations to change the proportions of the mix being extruded from the nozzles. In order to hold these separators in prearranged location there is provided means into which the edges of the separators are received. These are in the form of arbors 18 and 18' located adjacent the top of the housing and 19 and 19' located adjacent the bottom of the housing. These partitions may be preset to give the desired proportion of a selected mix or flavor to the finished block. If the dividers are arranged as shown in Figure 3, the housing will be divided into three equal compartments. If only one separator is used in slot 20 and the corresponding lower center slot, then the housing head will be separated into two compartments. While these arbors 18 and 19 are shown to hold the separators in three positions, any number of arbors and grooves may be provided to make any desired number of compartments in the head, the larger the compartment the more of a particular flavor or mix will be present in the finished ice cream block 25.

Figure 9:
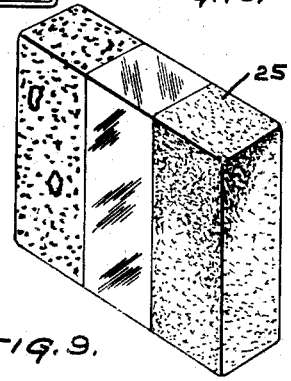
Figure 9 is a view in perspective of a block of ice cream produced by the head illustrating the several laminations contained in one deposit of ice cream through a single nozzle.

The outer end of the housing has a cover 22 or lower end member, which covers the entire area of the lower end of the head. This cover has mounted or formed thereon a plurality of nozzles of which seven are shown. However, this number may be increased or decreased depending upon the number of blocks desired in a single carton and the capacity of the supply source. These nozzles have their upper ends beginning substantially at the bottom of the housing or in the horizontal plane of the bottom cover 22. They are preferably rectangular in horizontal cross-section in order that they will extrude a rectangular block as shown in Figure 9. The nozzles 12 are tapered slightly and the extreme lower ends are turned slightly inwardly as shown at 11. This will give the extruded block a smooth surface. The upper edges 15 of the nozzles are shaped to form dividers or cutting edges for the material moving into the nozzles. The outer lower edges of the nozzles are separated by a narrow opening to allow a narrow opening between each of the nozzles. This allows for a container or carton as shown at 24, which has formed therein a separate depository for each nozzle (not shown) to be inserted up and over the nozzles to receive the deposit of the mix. The head is provided with stop members 40 for adjusting the initial position of the box. These stops may take any desirable form.

Figure 5:
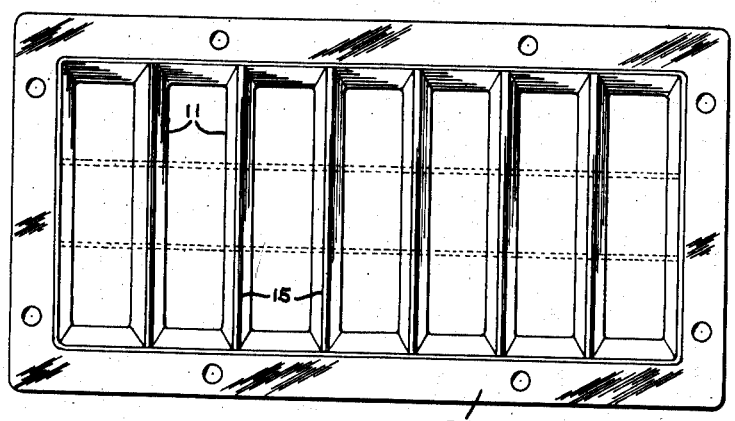
Figure 5 is a plan view of the lower cover plate and nozzles.
Figure 7:
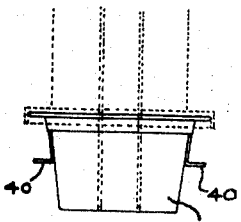
Figure 7 is a diagrammatic end view on a reduced scale of the lower end of the head, showing the separators in dotted lines.
Figure 6:
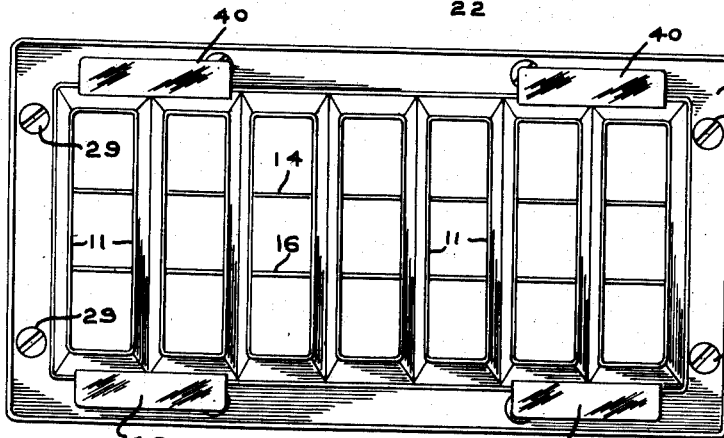
Figure 6 is an inverted view of the assembled head.
Figure 10:
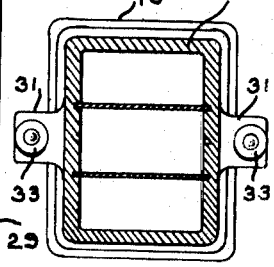
Figure 10 is an enlarged sectional view taken along the line 10—10 of Figure 8.

The bottom cover, or the nozzle supporting member is secured to the housing by any suitable means such as screws 28 and nuts 29. The upper end of the housing is secured to the combination mix inlet member 30 also by a suitable means, such as the eye bolts 32 and nuts 33. These eye bolts are adapted to engage a pair of ears 31 and 35. The mix inlet 30 is provided with suitable connections shown at 32, 32' and 32" for connecting it with the supply pipes 9 to 9". The inlet member 30 is divided into three separate channels as shown in Figure 10 which coincide with one of the compartments formed in the head by the separators. When the separators are changed to change the size and number of the compartments a corresponding inlet member 30 must be substituted.

In operation the different mixes, or flavors, are fed to the combination inlet member 30, through the pipes 9 to 9" and into the above mentioned compartments of the head. The mix is forced into the head through the supply lines in equal quantities and pressure. As the material moves down the funnel shaped head its speed is reduced as it approaches the bottom, because of the gradual increase in the area of the head. The separators are arranged transversely of the nozzles and the nozzle dividing elements 15, allowing the material or mix in each compartment to form a section of the amount pouring through each nozzle and in proportion to the area of the nozzle covered by the above compartment.

The mix is deposited directly into the container and as the material is traveling at a reduced speed from the nozzles there is time for inserting and removing the container without the necessity of a cut-off of the supply.

With the present device the mix may be deposited directly from all nozzles simultaneously into the container and in predetermined proportions.

By the present method there will be a considerable saving in handling, freezing facilities and machinery over the method now used.

While the invention has been illustrated and described in a particular form and for a specific purpose, it is not intended to be a limitation as other modifications and uses may be made without departing from the spirit and the scope of the appending claims.

I claim:

1. An extrusion head for semi-fluid filling machines comprising an elongated tapered housing, having a relatively small open upper end for receiving the said fluid from two or more filling machines, the lower end of the housing being larger and of rectangular form and having a plurality of adjoining individual nozzles extending downwardly from and across the larger end of the said housing, one or more dividers extending throughout the height of the said housing and across the small upper intake opening of the housing and extending downwardly adjacent the upper ends of each of the nozzle openings and dividing the housing into one or more compartments from the upper small opening to a point adjacent the top of the nozzles, each section of the small upper openings of the housing formed by the dividers adapted to be connected with a separate filling machine, whereby each nozzle will receive a portion of the fluid from each of the several filling machines.

2. An ice cream extrusion head for ice cream mixing machines for manufacturing ice cream units of two or more flavors comprising a funnel shaped housing, the small end of which extends upwardly and is adapted to be secured to the outlet pipes of the said machines, the larger end of the funnel shaped housing extending downwardly toward the outer end thereof, the upper end of the housing having a relatively small open end for admitting the mixes from the several machines, a detachable bottom covering the entire area of the outer end of the housing, said bottom having a plurality of tapered rectangular individual discharge nozzles having the edges of their larger ends joined to the bottom and to each other and extending downwardly from the said bottom, the taper of each nozzle being such as to form small openings between the lower ends of each nozzle, a plurality of removable separators for separating the housing in several compartments, each separator extending the full length of the housing including the intake opening at the upper end of the housing to a point within each of the lower end of all the nozzles, means for delivering the mixes from the several machines to the separate compartments of the head, whereby each separate mix coming from each of the filling machines will be channeled through one of the compartments to all the nozzles within the head and to a point adjacent the outer end of each nozzle for forming a single portion of ice cream of various flavors.

3. An extruder head for machines for handling semi-liquid materials comprising, an elongated open end tube having a relatively small upper end opening in comparison to its lower end opening, the length of the tube being not less than the width of its lower end, the tube being tapered outwardly from the relatively small upper opening in its downwardly direction, the lower end of the tube being of rectangular form, a plurality of individual rectangular nozzles extending downwardly from the lower edge of the rectangular lower end opening of the tube, the upper ends of the nozzles being joined to the lower end of the tube and along their adjacent edges, the lower ends of the nozzles being evenly spaced apart, whereby the semi-liquid material may be evenly distributed into the upper ends of the said nozzles and deposited and spaced apart in individual deposits into a single container.

JOHN F. ECKELS.
AUGUST E. ECKELS, Jr.

References Cited in the file of this patent

UNITED STATES PATENTS

| Number | Name | Date |
|---|---|---|
| 682,243 | Cuscaden et al. | Sept. 10, 1901 |
| 1,955,009 | McMillan | Apr. 17, 1934 |
| 2,122,703 | Weinreich | July 5, 1938 |
| 2,386,775 | Balzarini | Oct. 16, 1945 |
| 2,533,796 | Harris et al. | Dec. 12, 1950 |
| 2,539,944 | Bury | Jan. 30, 1951 |

FOREIGN PATENTS

| Number | Country | Date |
|---|---|---|
| 66,203 | Sweden | Oct. 28, 1928 |
| 355,570 | Germany | June 29, 1922 |